April 23, 1963  D. L. NICHOLS  3,086,490

ORIENTATION SYSTEM

Filed March 19, 1953

INVENTOR.
DONALD L NICHOLS
BY George Sipkin
ATTORNEY

United States Patent Office 3,086,490
Patented Apr. 23, 1963

3,086,490
ORIENTATION SYSTEM
Donald L. Nichols, Groton, Conn., assignor to the United States of America as represented by the Secretary of the Navy
Filed Mar. 19, 1953, Ser. No. 343,530
2 Claims. (Cl. 114—235)
(Granted under Title 35, U.S. Code (1952), sec. 266)

The invention described herein may be manufactured and used by or for the Government of the United States of America for governmental purposes without the payment of any royalties thereon or therefor.

This invention relates to control of the orientation of spaced objects and more particularly to control of the orientation of two vessels one of which is towing the other.

In the prior art one method of maintaining proper alignment or orientation of a towed vessel relative to that of the towing vessel involved the transmission of course information from the towing vessel to the towed vessel along electrical conductors in the towing cable. A north-seeking device installed in the towed vessel provided a reference direction. Additional equipment on the towed vessel made use of this reference direction along with the course information and formulated signals which moved the rudder. There were several disadvantages to this old method. The towed vessel had to carry the bulky north-seeking device and the equipment for making use of the course information. Also the north-seeking device employed was a complex and costly mechanism. Also the towing cable had to be larger than required by mechanical considerations because it had to carry a number of electrical conductors.

In the present invention a reference electric field is generated by one of the vessels. Sensing equipment on the vessel to be aligned or oriented controls the rudder of the latter. The advantages of this invention in maintaining the alignment or orientation of a towed and a towing vessel are that lighter, simpler equipment is carried by the towed vessel and the number of electric conductors is reduced thereby reducing the diameter of the towing cable.

An object of this invention is to provide a method and means to control the orientation of spaced objects.

A further object of this invention is to provide a method and means to orient continuously one or more objects with a reference electric field in a conducting medium.

A further object is to provide a method and means to maintain a towed vessel and a towing vessel in proper alignment.

A further object is to provide a method and means affording an indication of the position or orientation of one or more objects in a conducting medium.

Figure 1:
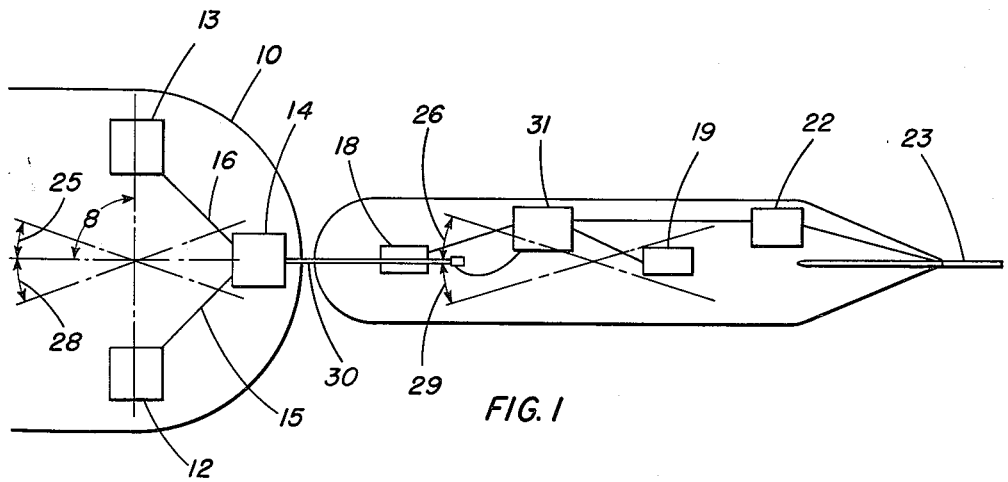
Figure 2:
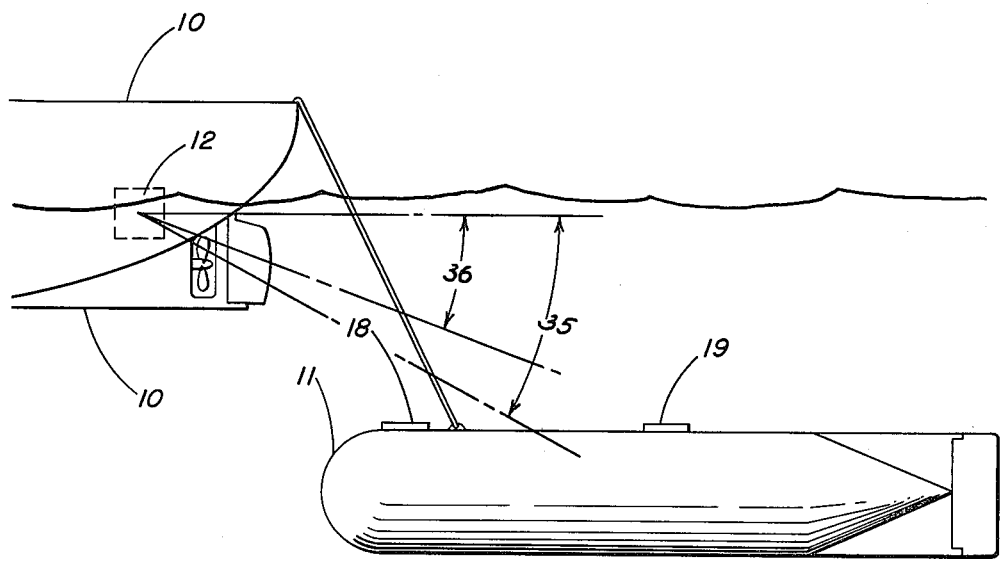

Other objects and many of the attendant advantages of this invention will be readily appreciated as the same becomes better understood by reference to the following detailed description when considered in connection with the accompanying drawings wherein:

FIG. 1 is a plan view showing a towing vessel and a towed vessel embodying this invention, and FIG. 2 is a side view of the arrangement shown in FIG. 1.

There is shown in FIGS. 1 and 2 a surface towing vessel 10 and a subsurface towed vessel 11. The towing vessel 10 has spaced electrodes 12 and 13 mounted across its beam. The electrodes 12 and 13 are connected to a power source 14 by means of conductors 15 and 16 respectively. When electrodes 12 and 13 are energized by power source 14 an electric field is created between them. The electric field is referred to hereinafter as a reference field.

The subsurface towed vessel 11 is provided with a pair of electrodes 18 and 19 the former of which is at the bow and the latter of which is at the stern of towed vessel 11. The electrodes 18 and 19 are arranged longitudinally of towed vessel 11 so that they can sense the reference field created by the electrodes 12 and 13. When the two vessels 10 and 11 are aligned, that is, when their longitudinal axes lie along a common line as viewed in FIG. 1, no voltage exists across electrodes 18 and 19 on the towed vessel 11. When the towing vessel 10 turns relative to the towed vessel 11 a voltage is developed across the electrodes 18 and 19. The polarity of such voltage is dependent upon the direction in which the axis of one vessel is displaced relative to the axis of the other vessel. This voltage, detected across electrodes 18 and 19, is used to cause rudder-actuating equipment 22 of the towed vessel 11 to move rudder 23 of the vessel. Thus, if the towing vessel 10 deviates from its course by an angle 25 the voltage detected by electrodes 18 and 19 of the towed vessel 11 will be utilized to operate the rudder equipment 22 to move the rudder 23 until the towed vessel 11 is moved through an angular displacement 26 which angular displacement is equal to the deviation of the towing vessel 10. Similarly if the towing vessel 10 is angularly displaced by an angle 28 opposite to angular deviation 25 the towed vessel 11 is likewise turned through an angular displacement 29 which angular displacement is equal to angular displacement 28 of the towing vessel 10. The towing cable 30 linking the two vessels includes a plurality of electric conductors that transfer phase reference information to a servo amplifier 31 on the towed vessel 11.

In operation an electric field is produced by electrodes 12 and 13 on a towing vessel 10. The electric field is a reference field for the towed vessel 11 relative to the towing vessel 10. The reference field is detected by means of one or more pairs of electrodes 18 and 19 on the towed vessel 11 for the purpose of indicating their position relative to the electric field or for actuating devices properly to orient the towed vessel 11 as a function of the field detected at the electrodes 18 and 19 of the towed vessel 11. A servomechanism controls the rudder 23 of the towed vessel 11 under the influence of the field detected by electrodes 18 and 19.

In general, this invention may apply where the orientation and the reference field is either fixed or changing, and where each of a multiplicity of objects has its own predetermined orientation. Although this invention has been described in connection with maintaining the alignment of a towed vessel submerged in water with respect to a towing vessel, it applies equally well to a towed vessel on the surface and to a submarine towing one or more objects. In addition, the principles involved may have other applications. For example, this invention can be used to indicate the position of, rather than to orient, one or more objects in a conducting medium.

Though this invention has been described in connection with towing, it may be applicable to many other problems involving a conducting medium such as water. Each application will probably require some modifications in the mechanisms employed, but the method and the principles will be essentially the same in all cases. For example, in certain applications in which a power supply is available in the towed object, the phase reference may be transmitted by an appropriate circuit, such as another electrode circuit, without additional interconnecting wires.

The transmission of direct current pulses through a body of water by Samuel Morse has been described in Popular Science Mechanical Encyclopedia by Hawks, Ellison, published by Popular Science Publishing Company, Inc., 354 4th Avenue, New York, Second Printing in 1943. Servo mechanisms and servo amplifiers and rudder actuating equipment are also well known and hence have been shown only conventionally by block diagrams. The invention is not in particular specific details of the servo amplifiers and mechanisms or in the rudder actuating means, but in the use of those devices broadly in the combinations with other elements.

Obviously many modifications and variations of the present invention are possible in the light of the above teachings. It is therefore to be understood that within the scope of the appended claims the invention may be practiced otherwise than as specifically described.

I claim:

1. An orientation system for use in towing on water, said system comprising a first vessel, a second vessel, a towing cable joining said vessels, a pair of first immersed spaced electrodes disposed across the beam of said first vessel, said first electrodes being adapted for connection to a suitable source of power, said first electrodes upon energization being adapted to create a reference field in the water, a pair of second immersed spaced electrodes disposed longitudinally of said second vessel, said second electrodes being adapted for sensing a difference of potential when said first and second vessels go out of proper orientation for towing.

2. The system defined in claim 1 in combination with a control means, said control means being connected to said second electrodes for energization when said first and second vessels move out of proper orientation for towing, said control means being adapted when energized from said second electrodes to actuate the rudder of said second vessel to return said second vessel to proper orientation with said first vessel for towing.

References Cited in the file of this patent

UNITED STATES PATENTS

| | | |
|---|---|---|
| 1,666,897 | Hammond | Apr. 24, 1928 |
| 2,359,366 | Katcher | Oct. 3, 1944 |
| 2,423,336 | Moseley | July 1, 1947 |

FOREIGN PATENTS

| | | |
|---|---|---|
| 188,676 | Great Britain | Dec. 14, 1922 |
| 578,844 | Great Britain | July 15, 1946 |